US010617970B2

(12) United States Patent
Rusch et al.

(10) Patent No.: US 10,617,970 B2
(45) Date of Patent: Apr. 14, 2020

(54) EVAPORATION SYSTEM, EVAPORATION METHOD, AND SEALING SYSTEM

(71) Applicant: SKF Marine GmbH, Hamburg (DE)

(72) Inventors: Mathias Rusch, Winsen Luhe (DE); Wolfgang Brandt, Norderstedt (DE); Nils Boettcher, Daldorf (DE); Carlos Fangauf, Hamburg (DE); Detlef Hammerschmidt, Rostock (DE); Andreas Konieczny, Hamburg (DE); Christian Preissler, Hamburg (DE); Marko Wrage, Struvenhuetten (DE); Lars Ziemen, Hamburg (DE)

(73) Assignee: SKF Marine GmbH, Hamburg (DE)

( * ) Notice: Subject to any disclaimer, the term of this patent is extended or adjusted under 35 U.S.C. 154(b) by 373 days.

(21) Appl. No.: 15/507,321

(22) PCT Filed: Aug. 5, 2015

(86) PCT No.: PCT/EP2015/068054
§ 371 (c)(1),
(2) Date: Feb. 28, 2017

(87) PCT Pub. No.: WO2016/030161
PCT Pub. Date: Mar. 3, 2016

(65) Prior Publication Data
US 2017/0282093 A1 Oct. 5, 2017

(30) Foreign Application Priority Data

Aug. 28, 2014 (DE) .................. 10 2014 217 226

(51) Int. Cl.
*B01D 1/02* (2006.01)
*B01D 1/14* (2006.01)
(Continued)

(52) U.S. Cl.
CPC ............. *B01D 1/14* (2013.01); *B01D 1/02* (2013.01); *B01D 3/34* (2013.01); *B01D 3/343* (2013.01);
(Continued)

(58) Field of Classification Search
CPC ........ B01D 17/0205; B01D 1/02; B01D 1/14; B01D 3/34; B01D 3/343; B01D 3/346
See application file for complete search history.

(56) References Cited

U.S. PATENT DOCUMENTS 4,162,972 A * 7/1979 Green .................. A23L 2/82
127/12
4,395,141 A 7/1983 Pietsch et al.
(Continued)

FOREIGN PATENT DOCUMENTS

CN 103003580 A 3/2013
DE 102006009614 A1 9/2007
(Continued)

*Primary Examiner* — Cabrena Holecek
(74) *Attorney, Agent, or Firm* — Garcia-Zamor Intellectual Property Law, LLC; Ruy Garcia-Zamor; Bryan Peckjian

(57) ABSTRACT

An evaporating system for separating at least two liquids mixed with one another includes a reactor vessel for receiving the mixture from an inlet, the mixture having a mixture level in the reactor vessel, a blowing-in device for blowing a gaseous aerating agent into the mixture and absorbing the first liquid, a heating device for heating the mixture, an outlet for discharging the aerating agent and the absorbed first liquid, and an inlet for introducing a gaseous fluid above the mixture level to generate a gaseous transport stream to the outlet.

10 Claims, 3 Drawing Sheets

(51) Int. Cl.
*B01D 3/34* (2006.01)
*B01D 17/02* (2006.01)

(52) U.S. Cl.
CPC ......... *B01D 3/346* (2013.01); *B01D 17/0205* (2013.01)

(56) References Cited

U.S. PATENT DOCUMENTS

| | | |
|---|---|---|
| 4,738,695 A | 4/1988 | Carr et al. |
| 2012/0193301 A1 | 8/2012 | Fujioka et al. |
| 2014/0048461 A1 | 2/2014 | Wrage et al. |

FOREIGN PATENT DOCUMENTS

| | | | | |
|---|---|---|---|---|
| DE | 102012016447 A1 | 5/2014 | | |
| EP | 2364194 A2 | 9/2011 | | |
| FR | 2388600 A1 | 11/1978 | | |
| GB | 191003122 A | * 8/1910 | ........... | D06F 43/007 |
| JP | S57179471 U | 11/1982 | | |
| JP | S6390402 A | 4/1988 | | |
| JP | H04275047 A | 9/1992 | | |
| JP | H06226001 A | 8/1994 | | |
| JP | 3006068 B2 | 2/2000 | | |
| JP | 2001276501 A | 10/2001 | | |
| JP | 201437222 A | 4/2016 | | |
| WO | 2009000019 A1 | 12/2008 | | |

\* cited by examiner

EVAPORATION SYSTEM, EVAPORATION METHOD, AND SEALING SYSTEM

CROSS-REFERENCE

This application is the U.S. National Stage of International Application No. PCT/EP2015/068054 filed on Aug. 5, 2015, which claims priority to German patent application no. 10 2014 217 226.8 filed on Aug. 28, 2014.

TECHNOLOGICAL FIELD

The invention relates to an evaporating system for separating at least two liquids mixed with one another, a method for separating at least two liquids mixed with one another, and a sealing system for sealing a shaft located under water.

BACKGROUND

A known sealing system is shown, for example, in DE 10 2012 016 447 A1. The sealing system serves for sealing a propeller shaft and has bushes placeable onto the shaft and connectable thereto such that they rotate together, which bush is enclosed by a housing fixed with respect to the bush. At least one lubricant chamber open to the bush is formed in the housing, into which lubricant chamber lubricant is introducible via a supply line and lubricant is dischargeable via a discharge line. Via the supply line and the discharge line the lubricant chamber is integrated in a lubricant circuit, wherein a filter for separating of seawater, for example that has mixed with the lubricant in the course of a leakage, is filtered out. In addition, the recirculation makes it possible to remove air that has entered into the lubricant chamber due to a leakage.

Furthermore, evaporating systems are known, using which water can be expelled from lubricant. One known lubricating system has a reactor vessel for receiving the lubricant mixed with the water, a blowing-in device for blowing-in of a gaseous aerating agent into the mixture, a heating device for heating the mixture, and an outlet for discharging the blown-in aerating agent and for discharging of liquid vapor. The water located in the lubricant is discharged cover-side as steam from the reactor vessel. The purified lubricant flows out base-side out of the reactor vessel. The aerating agent is preferably air and flows through the mixture in the opposite direction. The air is heated by the mixture and absorbs the water from the mixture up to the saturation limit.

In EP 2 364 194 B1 an evaporating system is shown wherein heated air is blown into the reactor vessel below a mesh material that is permeated by watery lubricant. Above the mesh material the mixture is introduced into the reactor vessel. Due to gravity the watery material permeates the mesh material from above to below and is flowed-through in the opposite direction by the rising air. The water is thereby washed out and removed cover-side from the reactor vessel as steam. The dewatered lubricant flows out base-side.

In principle with such evaporating systems there is the danger that the water vapor condenses prior to the discharging from the reactor container. The condensate then drips back in the reactor vessel or the lubricant, which requires a repeated expelling. For one thing the purification time is thereby increased, and the purification performance of the evaporating system is reduced.

SUMMARY

It is an object of the present invention to provide an evaporating system for rapid discharging of a liquid vapor. It is furthermore an object of the invention to provide a method that makes possible an additional separating of at least two liquids mixed with one another. Moreover it is an object of the invention to provide a sealing system including such an additional purifying.

An inventive evaporating system for separating of at least two liquids mixed with one another has a reactor vessel for receiving the mixture, a blowing-in device for blowing-in a gaseous aerating agent into the mixture, a heating device for heating the mixture, and an outlet for discharging the blown-in aerating agent and for discharging of liquid vapor. According to the invention an inlet is provided for introducing a gaseous fluid above a mixture level for generating a gaseous transport stream to the outlet. The transport stream represents a transverse flow with respect to a liquid-vapor-aerating-agent stream rising out of the mixture. This crossing orientation causes the liquid-vapor-aerating-agent steam to be absorbed by the transport stream and transported in a targeted manner to the outlet. The liquid-vapor-aerating-agent stream is also kept away from the reactor cover by the transport stream, whereby a condensate formation on the reactor cover is prevented. A rapid discharging is effected in particular of the liquid vapor, whereby a condensate formation inside the reactor vessel is effectively prevented. No or nearly no condensate can drip back in the reactor vessel or the mixture. As a result the inventive evaporating system has a short purifying time and a high purification performance. The introduced gaseous fluid is preferably the same as the aerating agent. The fluid and the aerating agent can thereby in principle be guided in a circuit. It is expressly noted that the term "fluid" is also understood to mean fluid mixtures. Preferably the gaseous fluid and the aerating agent are air. The energy that is necessary to maintain the reactor vessel at a sufficient temperature can be reduced if the reactor container is heat-insulated or consists of a heat-insulating material. Examples of heat-isolating or heat-insulating materials are plastics or composite plastics such as glass-fiber-reinforced plastics (fiberglass), carbon-fiber-reinforced plastics (CFRP), and the like.

A blower device for active blowing-in of the gaseous fluid can be provided inlet-side. The blower device can be provided simply, for example, by integration of the evaporating system or of the inlet into an onboard compressed-air network on vessels. Alternatively or additionally a suction device can be provided outlet-side virtually for active suction of the transport flow. If a suction device is exclusively provided outlet-side, the gaseous fluid is sucked into the reactor vessel. In the simplest case the inlet then represents an opening to the outside environment. Regardless of whether a blower device and/or suction device is provided it is preferred if the evaporating system forms a closed system, since closed systems are easier to control than open systems.

To avoid areas in the reactor vessel wherein the transport flow is not formed, it is advantageous if a fluid supply line for the transport flow is located in a reactor-vessel section that is disposed distant from an inlet opening of the outlet. It is thereby achieved that the entire or nearly entire surface of the mixture is covered by the transport flow. Relative to a vertical axis of the reactor vessel this means that the fluid supply line and the inlet opening are preferably disposed close to the wall or directly in wall sections of the reactor vessel diametrically opposite each other.

In order to prevent cooling of the liquid vapor by the transport flow, the inlet can interact with a heating device or with the heating device of the reactor vessel for heating of the to-be-introduced gaseous fluid.

The outlet preferably includes a downpipe extending, viewed from the reactor base, over a mixture level. Viewed in the installed position the liquid-vapor-aerating-agent stream together with the transport flow is thereby discharged downward out of the reactor vessel. Foams that form at the mixture level are thus also discharged out of the reactor vessel.

In order to prevent condensation that has unexpectedly formed on the reactor cover from dripping into the mixture it is advantageous if the reactor cover includes at least one guide surface oriented toward the inlet opening of the downpipe. The at least one guide surface ends at a depression from which the condensate can drip into the inlet opening. If the evaporating system is integrated in vessels, for example, in seal systems such as stern tube seals, the at least one guide surface is preferably engaged with respect to the installed position of the reactor vessel such that a dripping into the inlet opening is ensured even with a maximum permissible heel- or inclination-angle of the vessel. For this purpose the inlet opening can additionally be tapered funnel-shaped in the dripping direction or toward the reactor base.

The blowing-in device preferably has at least simply curved flow dividers, in the rising direction of the aerating agent or toward the reactor cover, for splitting a gas stream into a plurality of individual streams. Due to these measures the aerating agent is introduced into the mixture over a large cross-section and it is thus flowed-through at least nearly uniformly over its entire cross-section by the aerating agent. Due to the at least one curvature, even with a small transverse extension a large segmentation is achieved.

In order to prevent the formation of a surface film of the mixture, which would impede the escape of the liquid vapor from the mixture, the evaporating system can include an agitator in the reactor vessel for breaking up a surface film.

In one inventive method for separating at least two liquids mixed with one another in a reactor vessel, wherein at least one of the liquids is driven out from the mixture as liquid vapor under introduction of heat, a gaseous transport flow is actively generated by introducing of a gaseous fluid above a mixture level, which gaseous transport flow is oriented toward the outlet of the reactor vessel. The transport flow here is oriented with respect to a liquid-vapor-aerating-agent flow such that the liquid-vapor-aerating-agent flow is virtually carried along to the outlet. The transport flow represents a transverse flow with respect to the liquid-vapor-aerating-agent flow, whereby the liquid-vapor-aerating-agent flow is also kept away from the reactor cover. It is thereby effectively prevented that the liquid condenses and thus drips into the mixture. The preventing of such a condensing makes possible a rapid and effective separating of the mixture.

An inventive sealing system for sealing a shaft located under water has a bush placeable onto the shaft and connectable to the shaft such that they rotate together, which bush is enclosed by a housing fixed with respect to the bush. The housing has at least one lubricant chamber open to the bush, into which lubricant chamber lubricant is introducible via an inlet line and dischargeable via a discharge line. According to the invention the sealing system includes an inventive evaporating system wherein the inlet line is in fluid connection with a lubricant outlet and the discharge line with a lubricant inlet of the evaporating system. Such a sealing system is usable, for example, as a stern tube seal and makes possible an effective dewatering of the lubricant located in the at least one lubricant chamber from seawater penetrated due to a leakage in the lubricant chamber. In the floating position of the vessel if the dewatered lubricant is introduced above into the lubricant chamber and the watery lubricant is discharged below from the lubricant chamber, water that still forms no emulsion with the lubricant can be effectively discharged from the lubricant chamber. If the dewatered lubricant occurs below in the lubricant chamber and the removal of the watery lubricant above from the lubricant chamber, gases can also be effectively discharged from the lubricant chamber. Of course these two variants can also be alternated between, so that the discharging of water and the removal of gases takes place in an alternating sequential manner.

Other advantageous exemplary embodiments of the invention are the subject matter of further dependent claims.

BRIEF DESCRIPTION OF THE DRAWINGS

In the following, preferred exemplary embodiments of the invention are explained in more detail with reference to greatly simplified schematic illustrations.

DETAILED DESCRIPTION

Figure 1:
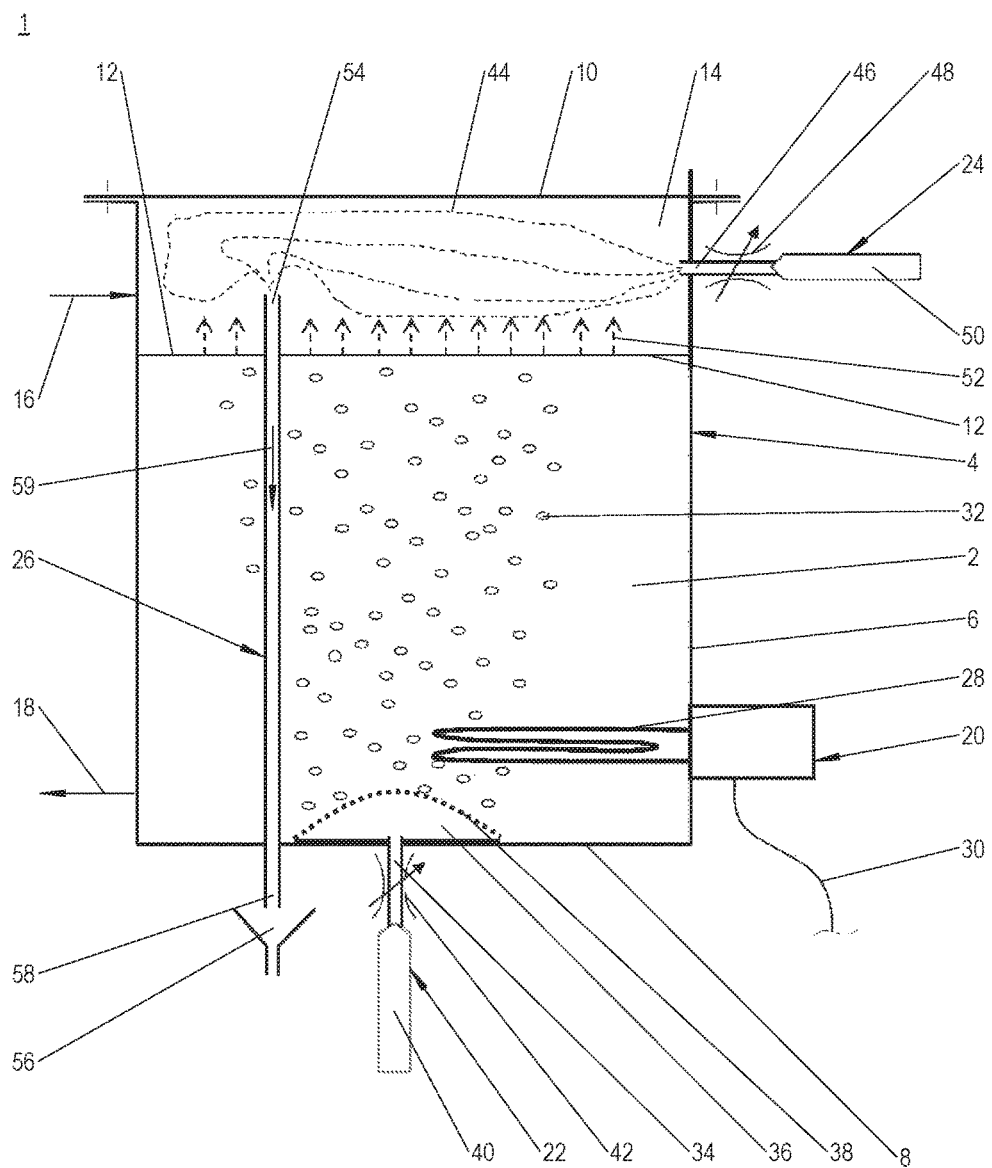
FIG. 1 shows a first exemplary embodiment of an inventive evaporating system.

In the Figures identical structural elements are provided with the same reference numbers.

A first exemplary embodiment of an inventive evaporating system 1 for separating of at least two liquids forming a mixture 2 has a reactor vessel 4 for receiving the mixture 2. The reactor vessel 4 is, for example, cylindrical with a tubular vessel wall 6, a flattened-dome-shaped vessel bottom 8 and a flattened-dome-shaped vessel cover 10. The reactor vessel consists at least in large part of a heat-insulating material such as a plastic or a composite plastic. If the container is manufactured in metal construction it is preferred if it is provided with an appropriate heat-insulation. The reactor container 4 is filled with the mixture 2 such that a free space 14 is always formed or maintained between a mixture level 12 and the vessel cover 10.

The evaporating system 1 also has a mixture inlet 16 located in the region of the free space 14, a liquid outlet 18 near the base, a heating device 20, a blowing-in device 22, an inlet 24 for introducing a gaseous fluid above the mixture level 12, and an outlet 26 for discharging this gaseous fluid among other things.

The mixture inlet 16 indicated here as an arrow is disposed in the region of the free space 14 so that the mixture 2 can be introduced without pressure into the reactor vessel 4. Of course the mixture inlet 16 can also be located under the mixture level 12.

The liquid outlet 18 indicated as a counter-arrow is disposed near the base so that it can be ensured that only the liquid which is driven out of the mixture 2 and thus purified can be removed from the reactor vessel 4.

The heating device 20 is disposed near the base in the region of the vessel wall 6 and has a heating coil 28 extending approximately up to the central axis of the reactor vessel 4. Preferably the heating device 20, as indicated by a power cable 30, is electrically driven.

The blowing-in device 22 serves for blowing-in an aerating agent 32, preferably air. The blowing-in device has a blowing-in line 34 penetrating the vessel base 8, which blowing-in line 34 is disposed parallel to the central axis of the reactor vessel 4. The blowing-in line 34 opens in a distribution space 36, which is delimited by a concave, viewed in the rising direction of the aerating agent 32, or shell-type, flow divider 38. The flow divider 38 has a plurality of openings by which a main stream flowing through the blowing-in line 34 is split into a plurality of individual streams. For blowing-in the aerating agent 32 the blowing-in device 22 includes a blower 40 that is in fluid connection with the blowing-in line 34. To control the flow-through an adjustable valve device 42, for example a throttle, is integrated into the blowing-in line 22. Instead of a separate blower 40 the blowing-in line 22 can be in fluid connection with an onboard compressed-air network.

The inlet 24 serves for introducing the gaseous fluid or a fluid mixture for forming a transport stream 44 above the mixture level 12 toward the outlet 26. It has an inlet line 46 that penetrates the vessel wall 6 in the region of the free space 14 above the mixture level 12. The inlet line 46 is open- and closable via an adjustable valve device 48, for example a throttle, integrated therein. The fluid is in particular air that can be blown-in into the reactor vessel 4 via a blower 50 in fluid connection with the inlet line 46. Instead of a separate blower 50 the inlet 24 can be connected to an onboard compressed-air network via the inlet line 46. For introducing the fluid in the heated state it can be heated via a not-shown heating device. Alternatively the fluid is heated via the heating device 20 of the reactor vessel 4.

The outlet here is depicted as a downpipe that extends parallel to the central axis of the reactor vessel 4. It is positioned distant from the inlet line 46 so that the entire mixture level 12 can be covered by the transport flow. The outlet 26 and the inlet line 46 are preferably disposed diametrically opposite. Viewed toward the transport stream 44 the outlet 26 extends out of the free space 14 and thus out of a reactor region above the mixture level 12 toward the vessel base 8 that it penetrates. Viewed in the installed position of the reactor vessel 4 a liquid-vapor-aerating-agent 52 absorbed by the transport stream 44 and escaping from the mixture 2 is thus discharged downward. The outlet 26 has an inlet opening 54 and an outlet opening 58 ending, for example, in a reservoir 56. The reservoir 56 can interact with a heat exchanger so that the liquid vapor is separated as condensate and the gaseous fluid thus obtained is supplied in the circuit operation as aerating agent of the blowing-in device 22 and/or to the inlet 24. The inlet opening 54 can be extended in a funnel-shaped manner in the opposite direction to the transport stream 44. When using the evaporating system 1 on a vessel the reservoir 56 can be a bilge.

In the following an inventive method is explained. The mixture 2 is comprised here of a watery lubricant or of a lubricant-water emulsion. The water shall now be expelled. The lubricant-water emulsion 2 is supplied by the mixture inlet 16 to the reactor vessel 4. The dewatered lubricant is removed by the liquid outlet 18 of the reactor vessel 4. Air is used as aerating agent 32 of the blowing-in device 22 and as gaseous fluid of the inlet 24.

The mixture is heated by energizing the heating device 20. During rising the blown-in aerating agent 32 is thereby heated by the mixture 2 and thus absorbs the water from the mixture 2 up to the saturation limit. The water is driven out as water vapor forms a water-vapor-air stream 52 above the mixture level 12 with the air 32. The water-vapor-air stream 52 rises vertically and impinges on the transport stream 44 or air stream 44 laterally blown-in above the mixture level 12. The transport stream 44 or air stream 44 extends transverse to the water-vapor-air stream 52 and forms a barrier for the water-vapor-air stream 52 oriented toward the reactor cover 10 so that it can cannot penetrate up to the reactor cover 10 but is rather kept away by the transport stream 44 or air stream 44. The transport stream 44 carries the water-vapor-air stream 52 along and flows with it mixed as entire stream or discharge stream 59 into the outlet 26. As a result the water is effectively driven out of the mixture 2 so that the lubricant can be removed dewatered from the reactor vessel 4 at the liquid outlet 18. The discharge stream 59 formed by the transport stream 44 and the water-vapor-air stream 52 can be subjected to a dehumidification. The dehumidified air of the evaporating system 1 can be returned by the dehumidifying into the circuit as aerating agent 32 or gaseous fluid for the transport stream 44.

Figure 2:
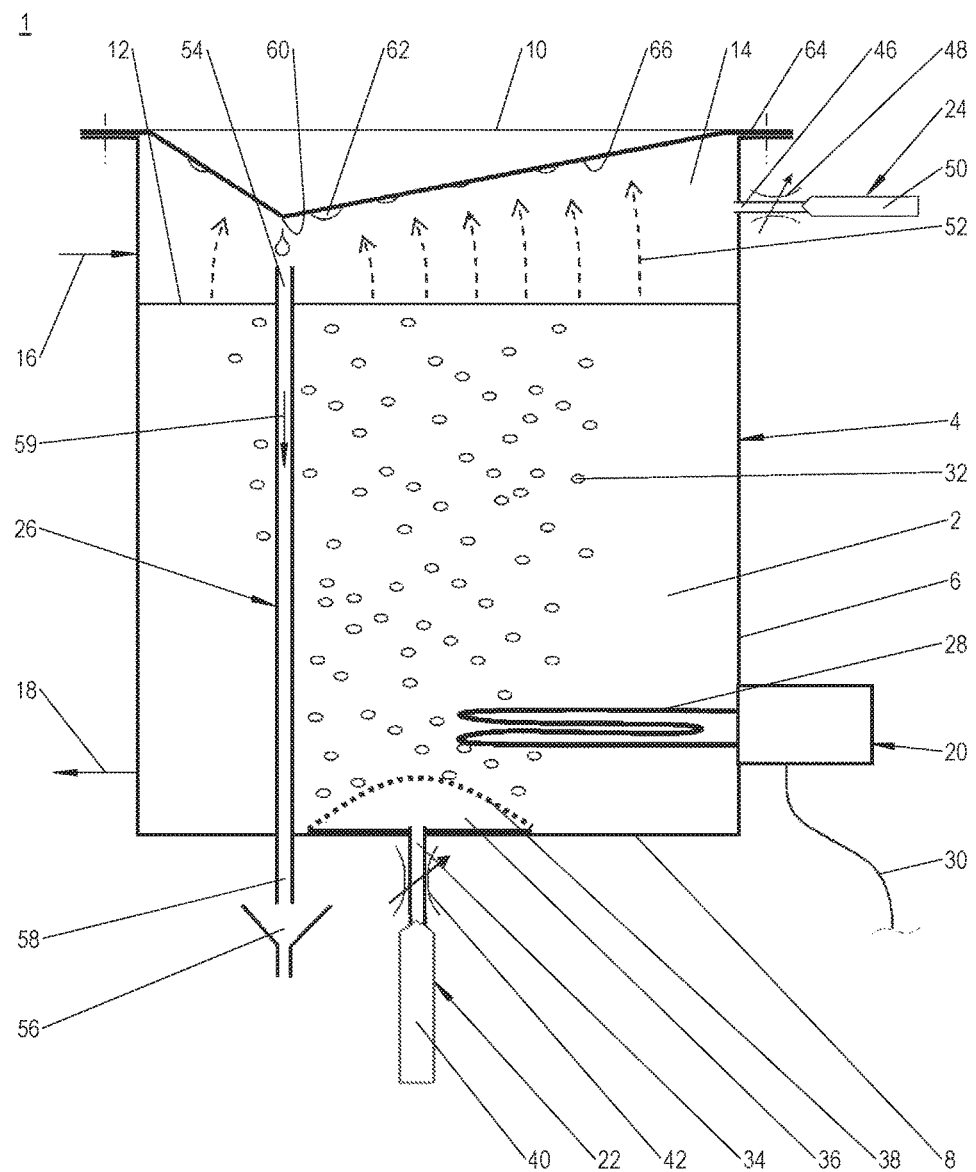
FIG. 2 shows a second exemplary embodiment of the inventive evaporating system.

In FIG. 2 a second exemplary embodiment of the inventive evaporating system 1 is shown. In contrast to the first exemplary embodiment according to FIG. 1 the second exemplary embodiment has an inner-side vessel cover 10 formed quasi funnel-shaped. The reactor cover 10 is formed funnel-shape such that in extension of a vertical outlet axis it has a depression above the inlet opening 54 of the outlet 26. The depression 60 serves or acts as dripping point of unexpected condensate 62 formed on the reactor cover 10, so that a dripping-back of the condensate into the mixture 2 is prevented. For targeted guiding of the condensate 62 the cover inner surface 66 extending from the cover edge 64 to the depression 56 surface serves as guide surface.

Figure 3:
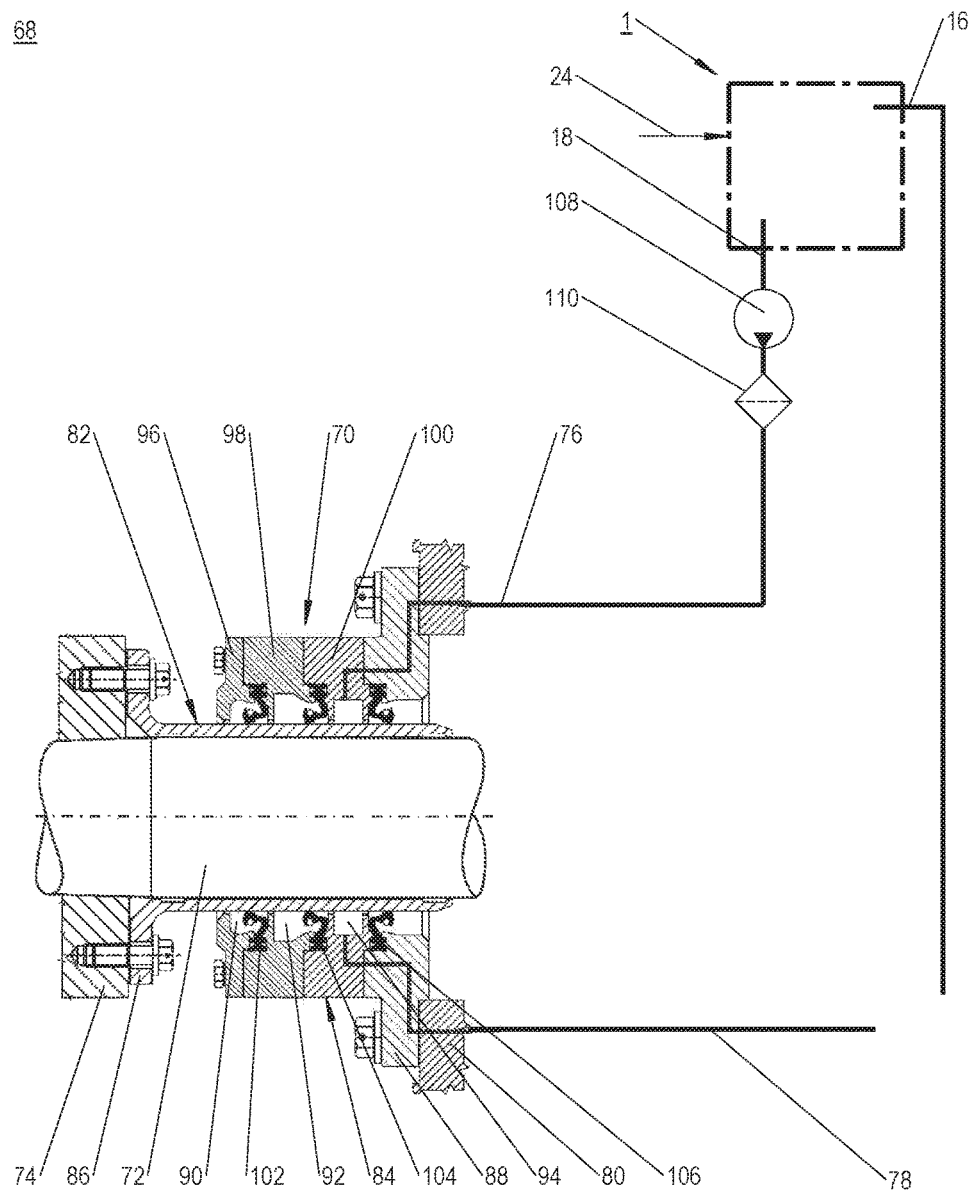
FIG. 3 shows a first exemplary embodiment of an inventive sealing system.

In FIG. 3 an inventive sealing system is shown, for example, for sealing a stern tube, which includes one of the above-described evaporating systems 1. The sealing system 68 has a shaft seal 70 for sealing a shaft 72. Here the shaft 72 is configured as a propeller shaft of a vessel on whose free end located in the seawater a propeller 74 is positioned. The evaporating system 1 is integrated into the sealing system 68 via an inlet line 76 and a discharge line 78 and in particular in fluid connection with the shaft seal 70.

The shaft seal 70 seals a vessel-hull-side stern tube 80 against the penetration of seawater. It has a bush 82 and a housing 84. The bush 82 is disposed on the shaft such that they rotate together and has an annular flange 86 for attaching to the propeller 74. It is rotatingly guided in the housing 84 that has an annular flange 88 for attaching to the stern tube 80. The bush or shaft-protection bush 82 encloses the shaft 72 over its entire free length and thus protects it from seawater.

The housing 84 is embodied multi-part and here has three annular chambers 90, 92, 94 that are open toward the bush 82 and in each a housing segment 96, 98, 100 is formed. The annular chambers 90, 92, 94 are respectively sealed against one another via an annular seal 102, 104, 106. They can be filled with different media wherein in the exemplary embodiment shown here the vessel-hull-side annular chamber 94 is filled with a lubricant such as oil. The lubricant is guided in the circuit by the annular chamber 94, wherein for this purpose the discharge line 78 extends from the annular chamber 94 to the mixture inlet 16 of the evaporating system 1, and the inlet line 76 from the liquid outlet 18 of the evaporating system 1 into the annular chamber 94. For pumping the lubricant through the annular chamber 94 a pump 108 as well as a filter 110 connected downstream from the pump for filtering-out of, for example, salts are disposed in the inlet line 76. As a result the watery lubricant of the annular chamber 94 is removed in operation, dewatered in the evaporating system 1, and guided back into the annular chamber 94 as dewatered and pure lubricant free of other contaminants.

In the exemplary embodiment shown here, in the installed position the lubricant dewatered in the evaporating system 1 is introduced above into the annular chamber 94, and the watery lubricant is discharged below from the annular chamber 94. This is advantageous in particular in order to discharge water from the annular chamber 94. Alternatively the inlet line 76 of the lubricant into the annular chamber 94 can occur below and the removal from the annular chamber 94 above. This is advantageous in particular for the discharging of gases from the annular chamber 94. Of course these two variants can also be alternated between, so that the discharging of water and the removal of gases can occur in an alternating sequential manner.

Disclosed is an evaporating system for separating of at least two liquids mixed with one another, including a reactor vessel for receiving the mixture, including a blowing-in device for blowing-in a gaseous aerating agent into the mixture, including a heating device for heating the mixture, and including an outlet for discharging the blown-in aerating agent and for discharging of liquid vapor, wherein an inlet for introducing a gaseous fluid is disposed above a mixture level for generating a gaseous transport stream to the outlet, a method, as well as a sealing system.

REFERENCE NUMBER LIST

1 Evaporating system
2 Mixture/Lubricant-water emulsion
4 Reactor vessel
6 Vessel wall
8 Reactor base
10 Reactor cover
12 Mixture level
14 Free space
16 Mixture inlet
18 Liquid outlet
20 Heat device
22 Blowing-in device
24 Inlet
26 Outlet
28 Heating coil
30 Power cable
32 Aerating agent/air
34 Blowing-in line
36 Distribution space
38 Flow divider
40 Blower
42 Valve device
44 Transport stream/air stream
46 Inlet line
48 Valve device
50 Blower
52 Liquid-vapor-aerating-agent stream/water-vapor-air stream
54 Inlet opening
56 Reservoir
58 Outlet opening
59 Outlet stream
60 Depression
62 Condensate
64 Cover edge
66 Guide surface
68 Sealing system
70 Shaft seal
72 Shaft
74 Propeller
76 Inlet line
78 Discharge line
80 Stern tube
82 Bush
84 Housing
86 Annular flange
88 Annular flange
90 Annular chamber
92 Annular chamber
94 Annular chamber
96 Housing segment
98 Housing segment
100 Housing segment
102 Annular seal
104 Annular seal
106 Annular seal
108 Pump
110 Filter

The invention claimed is:

1. An evaporating system for separating at least two liquids mixed with one another, the at least two liquids mixed together forming a mixture, including: an inlet, a reactor vessel defining a chamber for receiving the mixture from the inlet such that the chamber contains both the mixture and free space, the reactor vessel having a base and the chamber having an upper end, the mixture having a mixture level in the reactor vessel and the free space being located in the upper end of the chamber, a blowing-in device for blowing a gaseous aerating agent from the base of the reactor vessel into the mixture, to absorb a first liquid, a heating device for heating the mixture, an outlet for discharging the aerating agent and absorbed first liquid, the outlet having an inlet opening through which the aerating agent and absorbed first liquid enter the outlet for conveyance out of the chamber, the outlet having an outlet opening outside of the chamber through which the aerating agent and absorbed first liquid are ejected from the reactor vessel, the aerating agent and absorbed first liquid being removed from the reactor vessel via the base, and an inlet line for introducing a gaseous fluid above the mixture level to generate a gaseous transport stream to the outlet.

2. The evaporating system according to claim 1, wherein the blowing-in device is disposed inlet-side.

3. The evaporating system according to claim 1, wherein the inlet is diametrically spaced from the outlet.

4. The evaporating system according to claim 1, including a heater for heating the gaseous fluid of the transport stream.

5. The evaporating system according to claim 1, wherein viewed from the base of the reactor vessel the outlet includes a downpipe having an open end higher than the mixture level.

6. The evaporating system according claim 5, wherein the reactor vessel includes a reactor cover and the reactor cover has at least one guide surface oriented toward the open end of the downpipe.

7. The evaporating system according to claim 1, wherein the inlet includes a flow divider at least simply curved in a rising direction of the aerating agent for splitting a main stream of the aerating agent into a plurality of individual streams.

8. The evaporating system according to claim 1, including, an agitator in the reactor vessel for breaking up a surface film of the mixture.

9. The evaporating system according to claim 1, wherein a suction device is disposed outlet side.

10. The evaporating system according to claim 1, wherein the inlet is diametrically spaced from the outlet, including a heater for heating the gaseous fluid of the transport stream, wherein the outlet includes a downpipe having an open end higher than the mixture level, wherein the reactor vessel includes a reactor cover and the reactor cover has at least one guide surface oriented toward the open end of the downpipe, and wherein the inlet includes a flow divider at least simply curved in a rising direction of the aerating agent for splitting a main stream of the aerating agent into a plurality of individual streams.

* * * * *